United States Patent
Roh et al.

(10) Patent No.: US 10,454,739 B2
(45) Date of Patent: Oct. 22, 2019

(54) TRANSMISSION SCHEME FOR SC-FDMA WITH TWO DFT-PRECODING STAGES

(71) Applicant: TEXAS INSTRUMENTS INCORPORATED, Dallas, TX (US)

(72) Inventors: June Chul Roh, Allen, TX (US); Pierre Bertrand, Antibes (FR); Jun Yao, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/971,624

(22) Filed: Dec. 16, 2015

(65) Prior Publication Data

US 2016/0218905 A1 Jul. 28, 2016

Related U.S. Application Data

(60) Provisional application No. 62/107,038, filed on Jan. 23, 2015.

(51) Int. Cl.
*H04L 27/26* (2006.01)
*H04B 7/0456* (2017.01)
*H04L 1/00* (2006.01)

(52) U.S. Cl.
CPC ....... *H04L 27/2636* (2013.01); *H04B 7/0456* (2013.01); *H04L 1/0041* (2013.01); *H04L 1/0045* (2013.01)

(58) Field of Classification Search
CPC . H04L 27/2636; H04L 1/0041; H04L 1/0045; H04B 7/0456
See application file for complete search history.

(56) References Cited

U.S. PATENT DOCUMENTS 4,241,443 A * 12/1980 Sakaki ............... H04J 4/005
370/210
7,684,568 B2 * 3/2010 Yonge, III ......... G06F 21/606
380/262

(Continued)

FOREIGN PATENT DOCUMENTS

EP 1868/336 A2 12/2007
EP 2190126 A1 5/2010

OTHER PUBLICATIONS

"Data stream," Wikipedia.org via the Wayback Machine, https://web.archive.org/web/20150110115610/https://en.wikipedia.org/wiki/Data_stream, captured Jan. 10, 2015. (Year: 2015).*

(Continued)

*Primary Examiner* — Asad M Nawaz
*Assistant Examiner* — Thomas R Cairns
(74) *Attorney, Agent, or Firm* — Ebby Abraham; Charles A. Brill; Frank D. Cimino

(57) ABSTRACT

A method of operating a wireless communication system is disclosed. The method includes receiving first and second parallel data streams. The first data stream is converted to a first frequency-domain data stream by a discrete Fourier transform (DFT) having $N_{DFT0}$ size, where $N_{DFT0}$ is a positive integer. The second data stream is converted to a second frequency-domain data stream by a DFT having $N_{DFT1}$ size, where $N_{DFT1}$ is a positive integer. The first and second frequency-domain data streams are mapped to respective subcarriers.

6 Claims, 15 Drawing Sheets

(56) References Cited

U.S. PATENT DOCUMENTS

| | | | | |
|---|---|---|---|---|
| 7,916,775 | B2* | 3/2011 | Kim | H04L 1/1621 370/278 |
| 8,019,006 | B2* | 9/2011 | Khan | H04L 27/2614 370/203 |
| 8,400,958 | B2* | 3/2013 | Ko | H04B 7/0613 370/319 |
| 8,406,113 | B2* | 3/2013 | Zhao | H04J 11/0026 370/201 |
| 8,451,915 | B2* | 5/2013 | Khan | H04L 25/03343 370/204 |
| 8,520,494 | B2* | 8/2013 | Yang | H04L 5/0023 370/204 |
| 8,548,006 | B2* | 10/2013 | Ko | H04L 1/0625 370/480 |
| 8,571,041 | B2* | 10/2013 | Katar | H04L 12/417 370/321 |
| 8,644,397 | B2* | 2/2014 | Gaal | H04L 5/0048 375/259 |
| 8,699,609 | B2* | 4/2014 | Sorrentino | H04L 5/0007 375/267 |
| 8,711,828 | B2* | 4/2014 | Ko | H04B 7/0434 370/208 |
| 8,804,478 | B2* | 8/2014 | Han | H04W 56/0015 370/208 |
| 8,839,078 | B2* | 9/2014 | Abu-Surra | H03M 13/2707 714/758 |
| 8,848,650 | B2* | 9/2014 | Parkvall | H04L 27/2636 370/329 |
| 8,856,612 | B2* | 10/2014 | Kim | H03M 13/271 370/336 |
| 9,025,428 | B2* | 5/2015 | Jones, IV | H04L 5/0046 370/203 |
| 9,031,589 | B2* | 5/2015 | Goto | H04L 27/2614 455/103 |
| 9,178,677 | B2* | 11/2015 | Han | H04L 27/2602 |
| 9,203,672 | B2* | 12/2015 | Porat | H04L 1/0059 |
| 9,203,673 | B2* | 12/2015 | Porat | H04L 1/0071 |
| 9,237,051 | B2* | 1/2016 | Choi | H04L 27/2636 |
| 9,253,428 | B2* | 2/2016 | Allison, III | H04N 5/40 |
| 9,363,126 | B2* | 6/2016 | Nangia | H04L 5/0007 |
| 9,425,940 | B2* | 8/2016 | Park | H04L 5/001 |
| 9,497,056 | B2* | 11/2016 | Limberg | H04L 27/2003 |
| 9,629,158 | B2* | 4/2017 | Yu | H04W 72/0453 |
| 2006/0262870 | A1 | 11/2006 | Khan | |
| 2014/0185552 | A1* | 7/2014 | Lee | H04L 5/0039 370/329 |
| 2014/0376465 | A1 | 12/2014 | Choi et al. | |
| 2015/0009971 | A1* | 1/2015 | Han | H04L 5/001 370/336 |
| 2015/0263825 | A1* | 9/2015 | Kim | H04L 1/0042 375/260 |
| 2015/0271003 | A1* | 9/2015 | Kuchi | H04L 27/2646 370/329 |
| 2015/0282171 | A1* | 10/2015 | Yu | H04B 7/0857 370/330 |
| 2016/0013963 | A1* | 1/2016 | Hasegawa | H04L 27/2602 375/295 |
| 2016/0036615 | A1* | 2/2016 | Hasegawa | H04L 27/2602 370/329 |
| 2017/0111896 | A1* | 4/2017 | Han | H04W 72/0413 |

OTHER PUBLICATIONS

"Bit", Wikipedia.org via the WayBack Machine, https://web.archive.org/web/20150109054527/en.wikipedia.org/wiki/Bit, captured Jan. 9, 2015. (Year: 2015).*

"Signal (electrical engineering)" Wikipedia.org via the WayBack Machine, https://web.archive.org/web/20131229075945/https://en.wikipedia.org/wiki/Signal, captured Dec. 29, 2013. (Year: 2013).*

"Modulation," Wikipedia.org via the WayBack Machine, https://web.archive.org/web/20150111092223/https://en.wikipedia.org/wiki/Modulation, captured Jan. 11, 2015. (Year: 2015).*

International Search Report on PCT/US2016/014632 dated Jan. 31, 2018; 4 pages.

European search report; Application No./ Patent No. 16740881.4-1231/332548 PCT/US2016014632; dated Mar. 11, 2019; 13 pages.

EP Search Report; dated Jul. 25, 2019; (12 pages).

* cited by examiner

| UL-DL CONFIGURATION | SLOT NUMBER IN 5 MS FRAME | | | | | | | | | |
|---|---|---|---|---|---|---|---|---|---|---|
| | 0 | 1 | 2 | 3 | 4 | 5 | 6 | 7 | 8 | 9 |
| 5ms #1 | D | D | D | S | U | U | U | U | U | U |
| 5ms #3 | D | D | D | S | U | U | U | U | D | D |
| 5ms #5 | D | D | D | S | U | U | D | D | D | D |

FIG. 2

| INDEX | DFT SIZE | INDEX | DFT SIZE |
|---|---|---|---|
| 0 | 4 | 25 | 384 |
| 1 | 8 | 26 | 432 |
| 2 | 12 | 27 | 480 |
| 3 | 14 | 28 | 512 |
| 4 | 16 | 29 | 540 |
| 5 | 32 | 30 | 576 |
| 6 | 36 | 31 | 600 |
| 7 | 48 | 32 | 648 |
| 8 | 60 | 33 | 720 |
| 9 | 64 | 34 | 768 |
| 10 | 72 | 35 | 864 |
| 11 | 96 | 36 | 900 |
| 12 | 108 | 37 | 960 |
| 13 | 120 | 38 | 972 |
| 14 | 128 | 39 | 1024 |
| 15 | 144 | 40 | 1080 |
| 16 | 180 | 41 | 1152 |
| 17 | 192 | 42 | 1200 |
| 18 | 216 | 43 | 1296 |
| 19 | 240 | 44 | 1536 |
| 20 | 256 | 45 | 2048 |
| 21 | 288 | 46 | 3072 |
| 22 | 300 | 47 | 4096 |
| 23 | 324 | 48 | 6144 |
| 24 | 360 | 49 | 8192 |

FIG. 4

DFT SIZES FOR EACH DFT PRECODING STAGE (5 MHz BANDWIDTH)

| PHY CHANNEL | SC-FDMA SYMBOL TYPE | | | |
|---|---|---|---|---|
| | CONTROL CHANNEL (2PRBs) | CONTROL CHANNEL (4PRBs) | CONTROL CHANNEL (6PRBs) | CONTROL CHANNEL (8PRBs) |
| CONTROL CHANNEL | 24 | 48 | 72 | 96 |
| DATA CHANNEL | 276 | 252 | 228 | 204 |
| GUARD SCs | 0 | 0 | 0 | 0 |
| DATA CHANNEL, N_DFT0 | 180 | 144 | 120 | 108 |
| DATA CHANNEL, N_DFT1 | 96 | 108 | 108 | 96 |

FIG. 6A

DFT SIZES FOR EACH DFT PRECODING STAGE (10 MHz BANDWIDTH)

| PHY CHANNEL | SC-FDMA SYMBOL TYPE | | | |
|---|---|---|---|---|
| | CONTROL CHANNEL (2PRBs) | CONTROL CHANNEL (4PRBs) | CONTROL CHANNEL (6PRBs) | CONTROL CHANNEL (8PRBs) |
| CONTROL CHANNEL | 24 | 48 | 72 | 96 |
| DATA CHANNEL | 576 | 552 | 528 | 504 |
| GUARD SCs | 0 | 0 | 0 | 0 |
| DATA CHANNEL, N_DFT0 | 576 | 360 | 288 | 288 |
| DATA CHANNEL, N_DFT1 | - | 192 | 240 | 216 |

FIG. 6B

DFT SIZES FOR EACH DFT PRECODING STAGE (15 MHz BANDWIDTH)

| PHY CHANNEL | SC-FDMA SYMBOL TYPE | | | |
|---|---|---|---|---|
| | CONTROL CHANNEL (2PRBs) | CONTROL CHANNEL (4PRBs) | CONTROL CHANNEL (6PRBs) | CONTROL CHANNEL (8PRBs) |
| CONTROL CHANNEL | 24 | 48 | 72 | 96 |
| DATA CHANNEL | 876 | 848 | 828 | 804 |
| GUARD SCs | 0 | 4 | 0 | 0 |
| DATA CHANNEL, N_DFT0 | 576 | 720 | 540 | 480 |
| DATA CHANNEL, N_DFT1 | 300 | 128 | 288 | 324 |

FIG. 6C

DFT SIZES FOR EACH DFT PRECODING STAGE (20 MHz BANDWIDTH)

| PHY CHANNEL | SC-FDMA SYMBOL TYPE | | | |
|---|---|---|---|---|
| | CONTROL CHANNEL (2PRBs) | CONTROL CHANNEL (4PRBs) | CONTROL CHANNEL (6PRBs) | CONTROL CHANNEL (8PRBs) |
| CONTROL CHANNEL | 24 | 48 | 72 | 96 |
| DATA CHANNEL | 1176 | 1152 | 1128 | 1104 |
| GUARD SCs | 0 | 0 | 0 | 0 |
| DATA CHANNEL, N_DFT0 | 600 | 1152 | 648 | 720 |
| DATA CHANNEL, N_DFT1 | 576 | - | 480 | 384 |

FIG. 6D

TRANSMISSION SCHEME FOR SC-FDMA WITH TWO DFT-PRECODING STAGES

This application claims the benefit under 35 U.S.C. § 119(e) of Provisional Appl. No. 62/107,038, filed Jan. 23, 2015, which is incorporated herein by reference in its entirety.

BACKGROUND OF THE INVENTION

Embodiments of the present invention relate to wireless communication systems and, more particularly, to single-carrier frequency-domain multiple access (SC-FDMA) systems with multiple DFT-precoding stages.

An increasing data demand in cellular networks has resulted in the deployment of small cells providing Long Term Evolution (LTE) connectivity to a smaller number of users than the number of users typically served by a macro cell. This allows both providing larger transmission/reception resource opportunities to users as well as offloading the macro network. Technical challenges of the Radio Access Network (RAN) of small cells have been the focus of considerable standardization effort through 3GPP releases 10-12. It is a difficult technological challenge, especially for outdoor small cell deployment due to the non-conventional locations of small cell sites such as lamp posts, road signs, bus shelters, and traffic signals.

The LTE wireless access technology, also known as Evolved Universal Terrestrial Radio Access Network (E-UTRAN), was standardized by the 3GPP working groups. Orthogonal frequency-division multiple access (OFDMA) and SC-FDMA schemes were chosen for the downlink (DL) and uplink (UL) of E-UTRAN, respectively. User equipments (UEs) are time and frequency multiplexed on a physical uplink shared channel (PUSCH) and a physical uplink control channel (PUCCH), and time and frequency synchronization between UEs guarantees optimal intra-cell orthogonality. The LTE air-interface provides the best spectral-efficiency and cost trade-off of recent cellular networks standards, and as such, has been vastly adopted by operators as the unique 4G technology for the Radio Access Network (RAN), making it a robust and proven technology. As the tendency in the RAN topology is to increase the cell density by adding small cells in the vicinity of a legacy macro cells, the associated backhaul link density increases accordingly and the difference between RAN and backhaul wireless channels also decreases. There are several special issues associated with small cell sites, such as a requirement for high reliability with a packet error rate (PER) of $10^{-6}$, sparse spectrum availability, critical latency, cost, and relaxed peak-to-average power ratio (PAPR). Behavior of small cell sites also differs from RAN in that there is no handover, remote units do not connect and disconnect at the same rate as user equipment (UE) and the non-line-of-sight (NLOS) remote unit (RU) and small cell site is not mobile.

While preceding improvements in small cell topology have provided significant improvements in data throughput, the present inventors recognize that still further improvements are possible. Accordingly, the preferred embodiments described below are directed toward this as well as improving upon the prior art.

BRIEF SUMMARY OF THE INVENTION

In a first embodiment of the present invention, there is disclosed a method of operating a wireless communication system. The method includes receiving a first data stream and converting it to a first frequency domain data stream by a discrete Fourier transform (DFT) having $N_{DFT0}$ size, where $N_{DFT0}$ is a positive integer. The method further includes receiving a second data stream in parallel with the first data stream. The second data stream is converted to a second frequency-domain data stream by a DFT having $N_{DFT1}$ size, where $N_{DFT1}$ is a positive integer. The first and second frequency-domain data streams are mapped to respective subcarriers.

In a second embodiment of the present invention, there is disclosed a method of operating a wireless communication system. The method includes receiving a parallel data stream having first and second parts. The first part is converted to a first time-domain data stream by an inverse discrete Fourier transform (IDFT) having size $N_{DFT0}$, where $N_{DFT0}$ is a positive integer. The second part is converted to a second time-domain data stream by an IDFT having size $N_{DFT1}$, where $N_{DFT1}$ is a positive integer.

In a third embodiment of the present invention, there is disclosed a method of operating a wireless communication system. The method includes encoding a serial data stream with a forward error correction (FEC) code to produce FEC encoded data. The FEC encoded data is mapped into a series of symbols. A phase pilot symbol is inserted into the series of symbols.

BRIEF DESCRIPTION OF THE SEVERAL VIEWS OF THE DRAWING

FIG. 2 is a diagram of a subset of frame configurations of the present invention;

FIG. 4 is a table showing 50 predetermined discrete Fourier transform (DFT) or inverse discrete Fourier transform (IDFT) sizes and their corresponding indices;

FIGS. 6A through 6D are tables showing predetermined DFT/IDFT sizes for respective system bandwidths of 5 MHz, 10 MHz, 15 MHz, and 20 MHz;

DETAILED DESCRIPTION OF THE INVENTION

Figure 1:
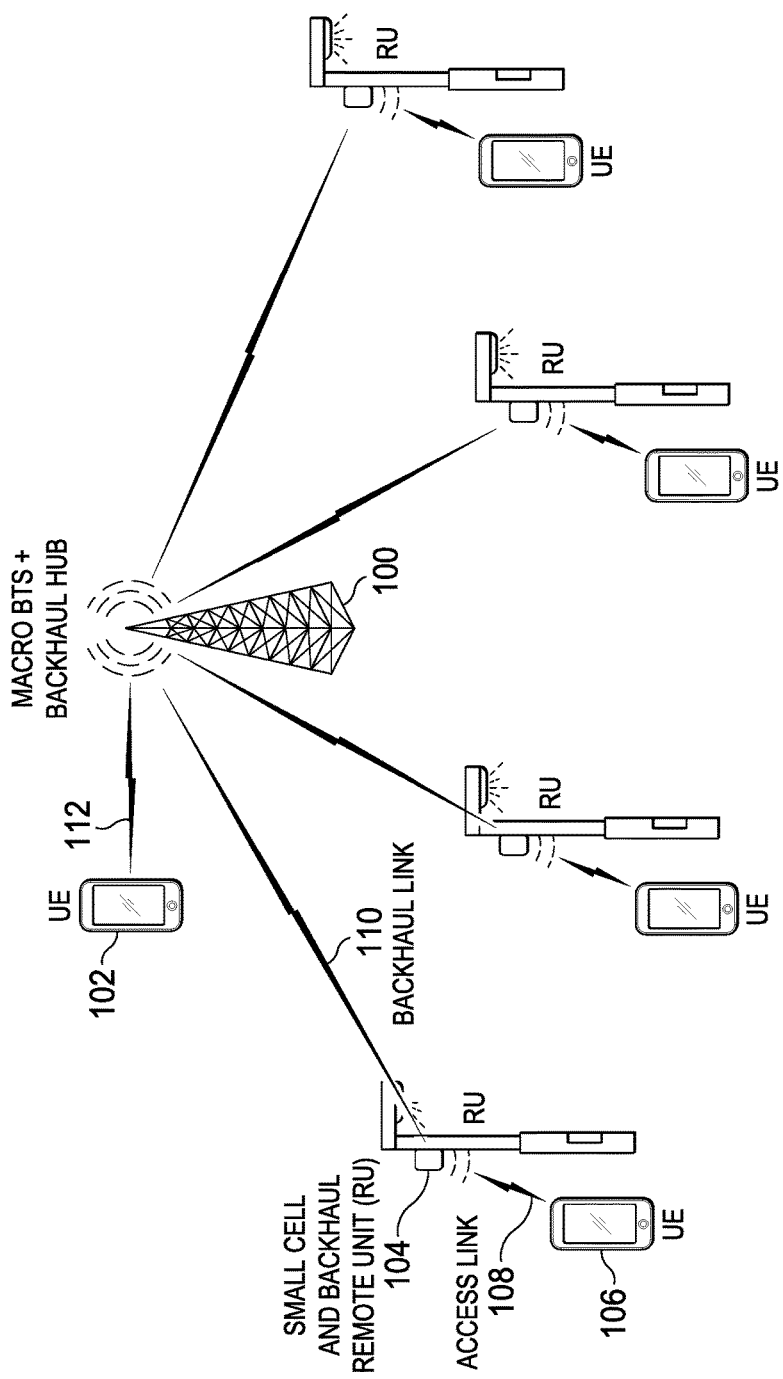
FIG. 1 is a diagram of a wireless communication system with a cellular macro site hosting a backhaul point to multipoint (P2MP) hub unit (HU) serving plural remote units (RUs) which relay communications between small cells and plural user equipment (UE)

Referring to FIG. 1, there is a NLOS Time Division Duplex (TDD) wireless backhaul system according to the present invention. Cellular macro site 100 hosts a macro base station. Macro site 100 also hosts a wireless backhaul hub unit (HU). Macro site 100 is connected with small cell sites such as small cell site 104. Each small cell site is co-located with a small cell base station and wireless backhaul remote unit (RU). Macro site 100 communicates with the small cell sites through a point-to-multipoint (P2MP) wireless backhaul system via backhaul links such as backhaul link 110. The base station of macro site 100 communicates directly with UE 102 over RAN link 112. UE 106, however, communicates directly with the small cell base station of small cell site 104 over a RAN access link 108. The RU of small cell site 104, in turn, communicates directly with the HU of macro cell site 100 over a backhaul link 110. The system is designed to maximize spectrum reuse. The backhaul link 110 design utilizes a 0.5 ms slot-based transmission time interval (TTI) to minimize latency and 5 ms UL and DL frames for compatibility with TD-LTE. Alternative embodiments of the present invention may use a different frame duration and different slot-based TTI.

FIG. 2 illustrates UL/DL frame configurations 1, 3 and 5 according to the present invention. Each frame has a 5 ms duration and is slot based rather than subframe based. Each frame has ten (0-9) slots. Each slot has a 0.5 ms duration. Of course, alternative embodiments of the present invention may use a different frame duration and different slot-based transmit time interval (TTI). Here, D indicates a downlink slot, and U indicates an uplink slot. In each of the three UL/DL configurations, slots 3 are special slots indicated by an S. This fixed location of the special slot assures backward compatibility with TD-LTE frames. It advantageously permits always finding an NLOS UL/DL configuration that is 100% compatible with any 5 ms period TD-LTE UL/DL subframe configuration. For example, this prevents an NLOS backhaul DL transmission from interfering with a TD-LTE RAN UL transmission on an access link when both operate on the same frequency. In other words, it advantageously prevents the transmitter at macro cell site 100 of one system from interfering with the receiver of a co-located system.

Figure 3:
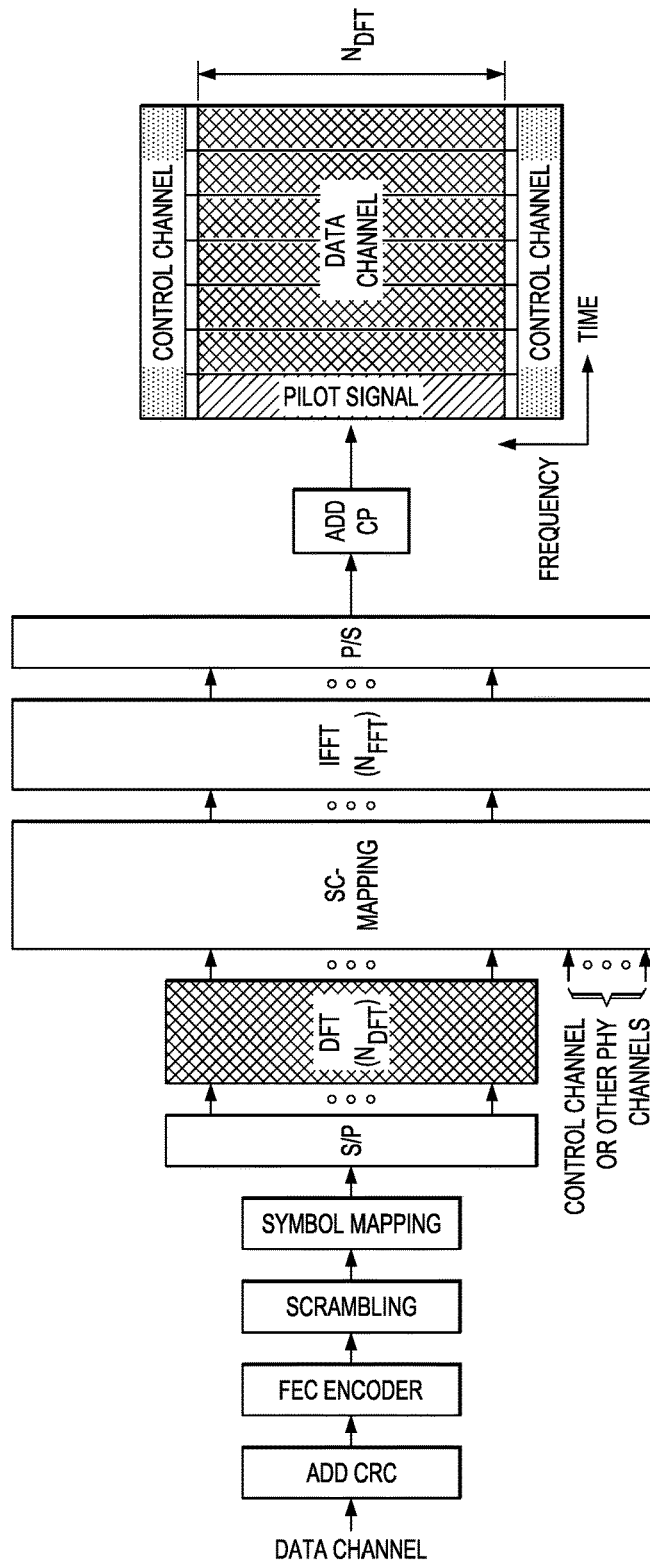
FIG. 3 is a diagram of a typical baseband transmitter of the prior art.

Referring to FIG. 3, there is a diagram of a typical baseband transmitter of the prior art. Here and in the following discussion, one of ordinary skill in the art will understand that any reference to a circuit may include circuits formed by hardware, software, or a combination of hardware and software. The baseband transmitter of FIG. 3 receives data signals and adds a cyclic redundancy check (CRC) block. The data is then encoded or precoded by a forward error correction (FEC) encoder and scrambled by a scrambling circuit. The scrambled data is mapped to appropriate symbol constellations and converted to a parallel data stream. A discrete Fourier transform (DFT) preceding stage converts data to frequency domain and applies it to a subcarrier (SC) mapping circuit together with control channel and other physical (PHY) channel data. The parallel data stream is then converted back to time-domain data and converted to a serial data stream. A cyclic prefix is appended to the serial data stream. The resulting output data of a time slot is conceptually represented on the right with time as the horizontal axis and frequency as the vertical axis. The time slot is preferably 0.5 ms in duration with seven SC-FDMA symbols. The first SC-FDMA symbol is a pilot signal that transmits a predefined frequency-domain signal to assist the receiver in performing channel estimation. The next six SC-FDMA symbols in time are for the data channel. The bandwidth of the time slot may be from 5 MHz to 20 MHz and includes upper and lower subcarriers reserved for control channels at each end of the frequency band. A space between the Control Channel and Pilot Signal/Data Channel indicates possibly unused subcarriers. This may happen when a particular size DFT is not supported. It frequently occurs when a small number of UEs or RUs are assigned to an available radio resource and reduces spectral efficiency.

One problem with the DFT circuit of the prior art is that it is necessarily restricted to discrete sizes. This is because DFT operations are typically realized in hardware due to a high data throughput requirement. Of course, the same restriction applies to receivers and their corresponding inverse discrete Fourier transforms (IDFT) as will be discussed in detail. FIG. 4 is a table showing 50 predetermined discrete Fourier transform (DFT) or inverse discrete Fourier transform (IDFT) sizes and their corresponding indices. These predetermined sizes are provided by Texas Instruments Incorporated in their Keystone family of System on Chip (SoC) products. When a single transmission link or small number of transmission links is assigned to a large frequency band, it is possible that the whole frequency spectrum cannot be filled and some subcarriers are not used for communication. For example, a LTE 20 MHz system has 1200 subcarriers with a 15 kHz subcarrier spacing. If the control channels (FIG. 3) require 24 subcarriers including 12 above and 12 below the data channel, there are 1176 subcarriers still available for the data channel. DFT index 41 (FIG. 4) is used for the data channel, but 24 subcarriers (1200−24−1152=24) remain unused. Thus, the spectral efficiency of the communication system is less than optimal.

Figure 5A:
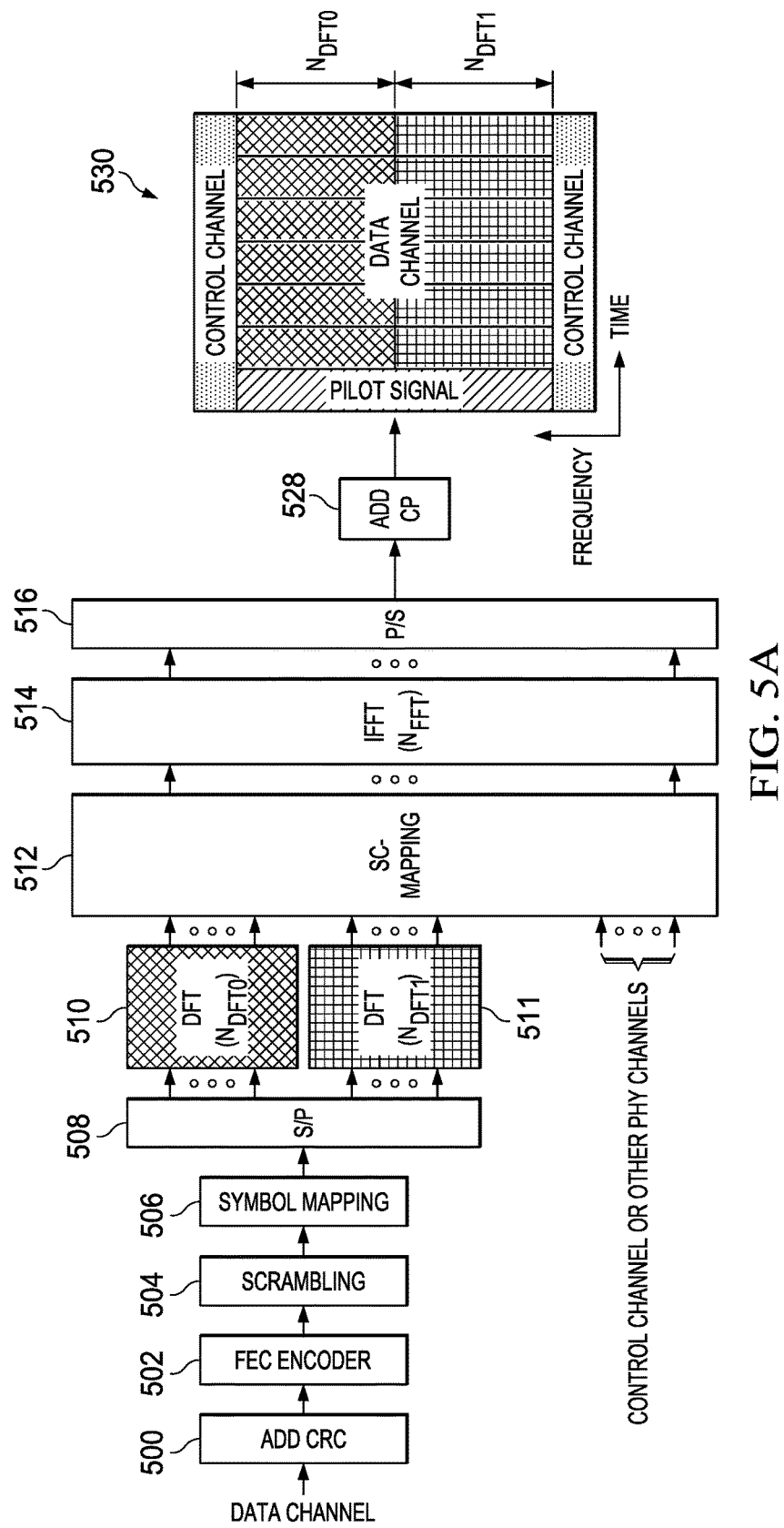
FIG. 5A is a diagram of a baseband transmitter of the present invention having two separate DFT precoding stages.

Referring now to FIG. 5A, there is a diagram of a baseband transmitter according to a first embodiment of the present invention having two separate DFT precoding stages. The baseband transmitter of FIG. 5A receives data signals and adds a cyclic redundancy check (CRC) block 500. The data is then encoded or precoded by a forward error correction (FEC) encoder 502 and scrambled by scrambling circuit 504. The scrambled data is mapped to appropriate symbol constellations 506 and converted to a parallel data stream 508. Discrete Fourier transform (DFT) circuits 510 and 511 convert data to frequency-domain signals and apply it to a subcarrier (SC) mapping circuit 512 together with control channel and other physical (PHY) channel data. DFT circuit 510 uses DFT index 31 with $N_{DFT0}$=600. DFT circuit 511 uses DFT index 30 with $N_{DFT1}$=576. Taken together, they allocate 1176 subcarriers to the data channel 530, and all available subcarriers are used. The frequency-domain data is applied to a subcarrier (SC) mapping circuit 512 together with control channel and other physical (PHY) channel data. The parallel data stream is then converted back to time-domain data 514 and converted to a serial data stream 516. A cyclic prefix is appended to the serial data stream 528. The resulting output data of a time slot 530 is conceptually represented on the right with time as the horizontal axis and frequency as the vertical axis. The upper portion of the data channel corresponds to $N_{DFT0}$ subcarriers produced by DFT circuit 510, and the lower portion of the data channel corresponds to $N_{DFT1}$ subcarriers produced by DFT circuit 511. The embodiment of FIG. 5A advantageously uses parallel DFT preceding stages 510 and 511 to fully use available subcarriers, thereby maximizing spectral efficiency.

Figure 5B:
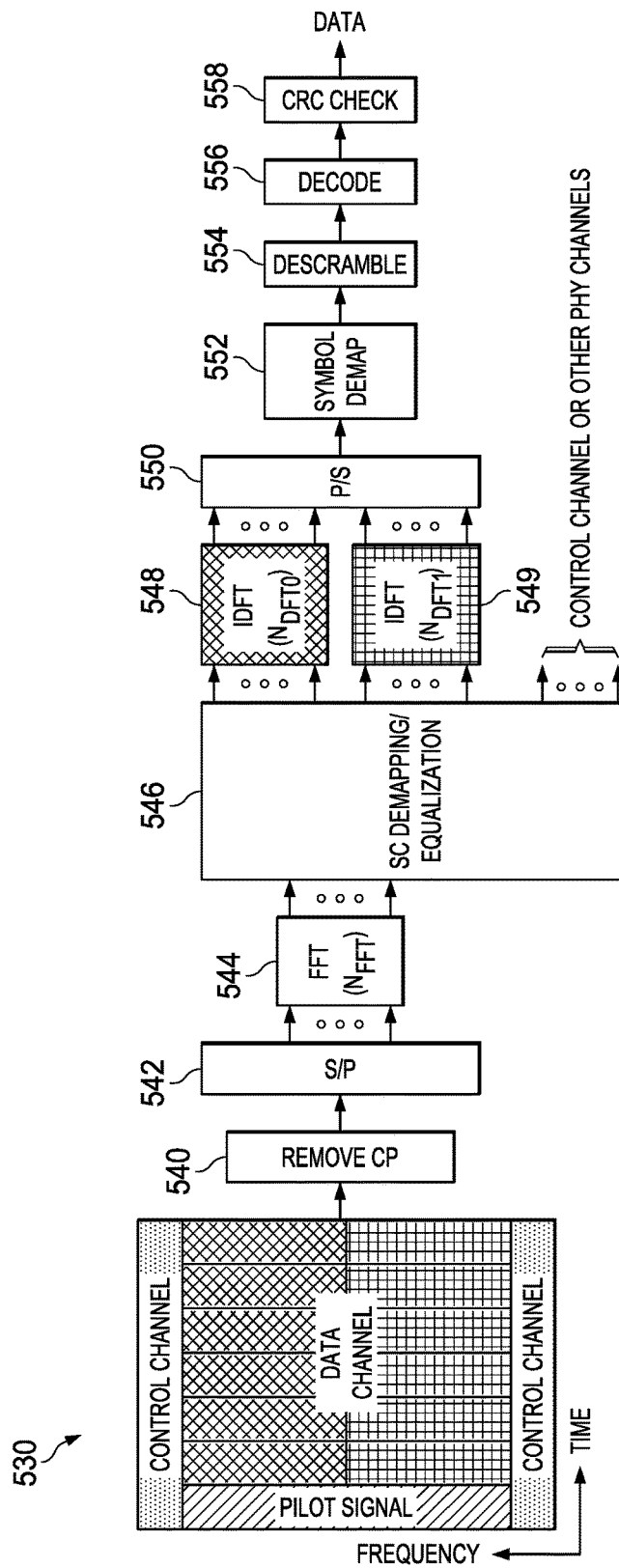
FIG. 5B is a diagram of a baseband receiver of the present invention having two separate IDFT decoding stages.

Referring next to FIG. 5B, there is a diagram of a baseband receiver of the present invention having two separate IDFT stages. Data 530 is applied to the baseband receiver, and the cyclic prefix (CP) is removed 540. Serial-to-parallel circuit 542 converts the data to a parallel data stream which is applied to fast Fourier transform (FFT) circuit 544. The resulting frequency-domain data is applied to subcarrier demapping and equalization circuit 546. Here, individual subcarriers are preferably equalized to compensate for channel effects. The equalized data is then applied to inverse discrete Fourier transform (IDFT) circuits 548 and 549. IDFT circuit 548 performs an $N_{DFT0}=600$ conversion corresponding to DFT circuit 510. IDFT circuit 549 performs an $N_{DFT1}=576$ conversion corresponding to DFT circuit 511. The resulting time-domain data is applied to parallel-to-serial circuit 550. The resulting serial data stream is then applied to symbol demapping circuit 552. Here, a log likelihood ratio (LLR) calculation is performed on the received and equalized QAM symbols to provide soft-decision information for each information bit to a FEC decoder (e.g. Turbo decoder). The resulting soft-decision information is then descrambled 554 and applied to decode circuit 556. The resulting decoded data is then applied to cyclic redundancy check (CRC) circuit 558 to verify correct data reception.

The previous examples of FIGS. 5A and 5B advantageously utilize all 1200 subcarriers of the 20 MHz bandwidth without unused or guard subcarriers. Data and control channel allocation sizes are specified as part of the air interface standard. Of course, other sizes of DFT and IDFT combinations are possible. For example, DFT circuit 510 might use DFT index 40 with $N_{DFT0}=1080$, and DFT circuit 511 might use DFT index 11 with $N_{DFT1}=96$. Alternatively, DFT circuit 510 might use DFT index 37 with $N_{DFT0}=960$, and DFT circuit 511 might use DFT index 18 with $N_{DFT1}=216$. Taken together, however, the selected combinations both utilize 1176 subcarriers of data channel 530.

FIGS. 6A through 6D are tables showing predetermined DFT/IDFT sizes for respective system bandwidths of 5 MHz, 10 MHz, 15 MHz, and 20 MHz, having 300, 600, 900, and 1200 system subcarriers, respectively. Embodiments of the present invention preferably use the same tables for DFT and IDFT allocation. Each row shows respective PHY channel categories and includes control channel, data channel, and unused or guard subcarrier allocations as well as DFT0 and DFT1 sizes for the data channel. Each column shows various subcarrier allocations for control channels having 2 or 4 physical resource blocks (PRBs). There are four different control channel allocation sizes depending on the required amount of control information in each mode of operation. For maximum spectral efficiency, the sum of Control Channel, Data Channel, and Guard Subcarriers in each column should equal the total number of system subcarriers for the respective system bandwidth. The sum of $N_{DFT0}$ and $N_{DFT1}$ is equal to the number of subcarriers in the Data Channel. The two selected DFT sizes of FIGS. 6A through 6D of the parallel DFT preceding stages advantageously provide a minimum number of unused or guard subcarriers, thereby maximizing spectral efficiency of the system. The previous examples of FIGS. 5A and 5B utilize allocations in the first column of FIG. 6D with $N_{DFT0}=600$ and $N_{DFT1}=576$. Furthermore, in some cases only a single DFT and IDFT circuits are necessary. For example, only a single DFT precoding stage with $N_{DFT0}=576$ is necessary for the 10 MHz bandwidth with 2 PRBs as shown in the left column of FIG. 6B. Also, only a single DFT precoding stage with $N_{DFT0}=1152$ is necessary for the 20 MHz bandwidth with 4 PRBs as shown in the second column of FIG. 6D. Finally, although only two DFT/IDFT sizes are provided by way of example, one of ordinary skill in the art having access to the instant specification will understand that three or more DFT/IDFT sizes may be allocated to utilize all available subcarriers.

Figure 7A:
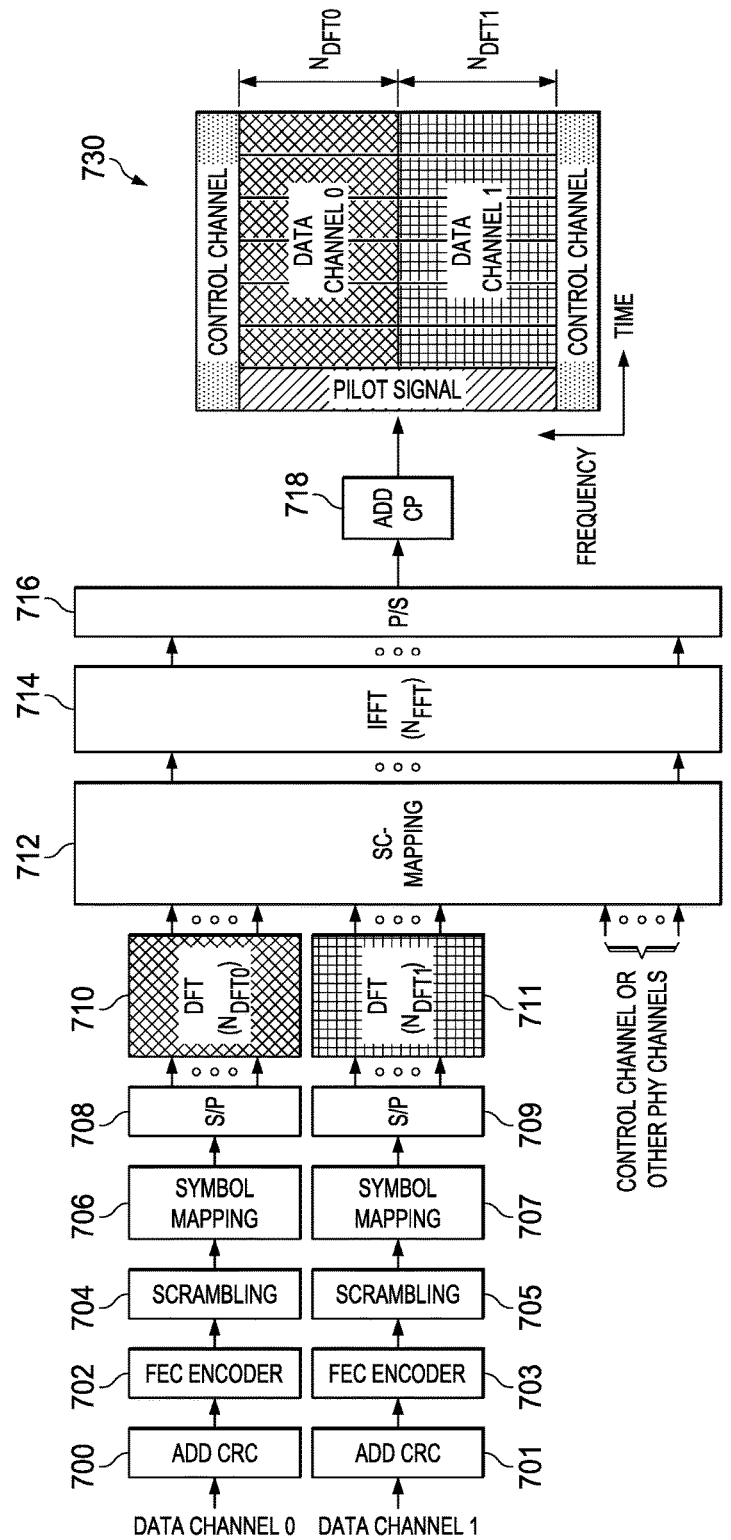
FIG. 7A is a diagram of a baseband transmitter of the present invention having two separate and parallel DFT precoding stages.

Turning now to FIG. 7A, there is a diagram of a baseband transmitter according to a second embodiment of the present invention having two separate and parallel DFT preceding stages. This embodiment provides two separate data channels, each having its own respective transport block. Data channel 0 includes CRC circuit 700 and FEC encoder circuit 702 followed by scrambling circuit 704. Scrambled data is symbol mapped by circuit 706 and applied to serial-to-parallel (S/P) circuit 708. The parallel data stream is then applied to DFT circuit 710, having size $N_{DFT0}$ as previously described. Data channel 1 is formed in parallel with data channel 0 and includes CRC circuit 701 and FEC encoder circuit 703 followed by scrambling circuit 705. Scrambled data is symbol mapped by circuit 707 and applied to S/P circuit 709. The parallel data stream is then applied to DFT circuit 711, having size $N_{DFT1}$ as previously described. The frequency-domain data is applied to a subcarrier (SC) mapping circuit 712 together with control channel and other physical (PHY) channel data. The parallel data stream is then converted back to time-domain data 714 and converted to a serial data stream 716. A cyclic prefix is appended to the serial data stream 718. The resulting output data of a time slot 730 is conceptually represented on the right with time as the horizontal axis and frequency as the vertical axis. The upper portion (data channel 0) corresponds to $N_{DFT0}$ subcarriers produced by DFT circuit 710, and the lower portion (data channel 2) corresponds to $N_{DFT1}$ subcarriers produced by DFT circuit 711.

Figure 7B:
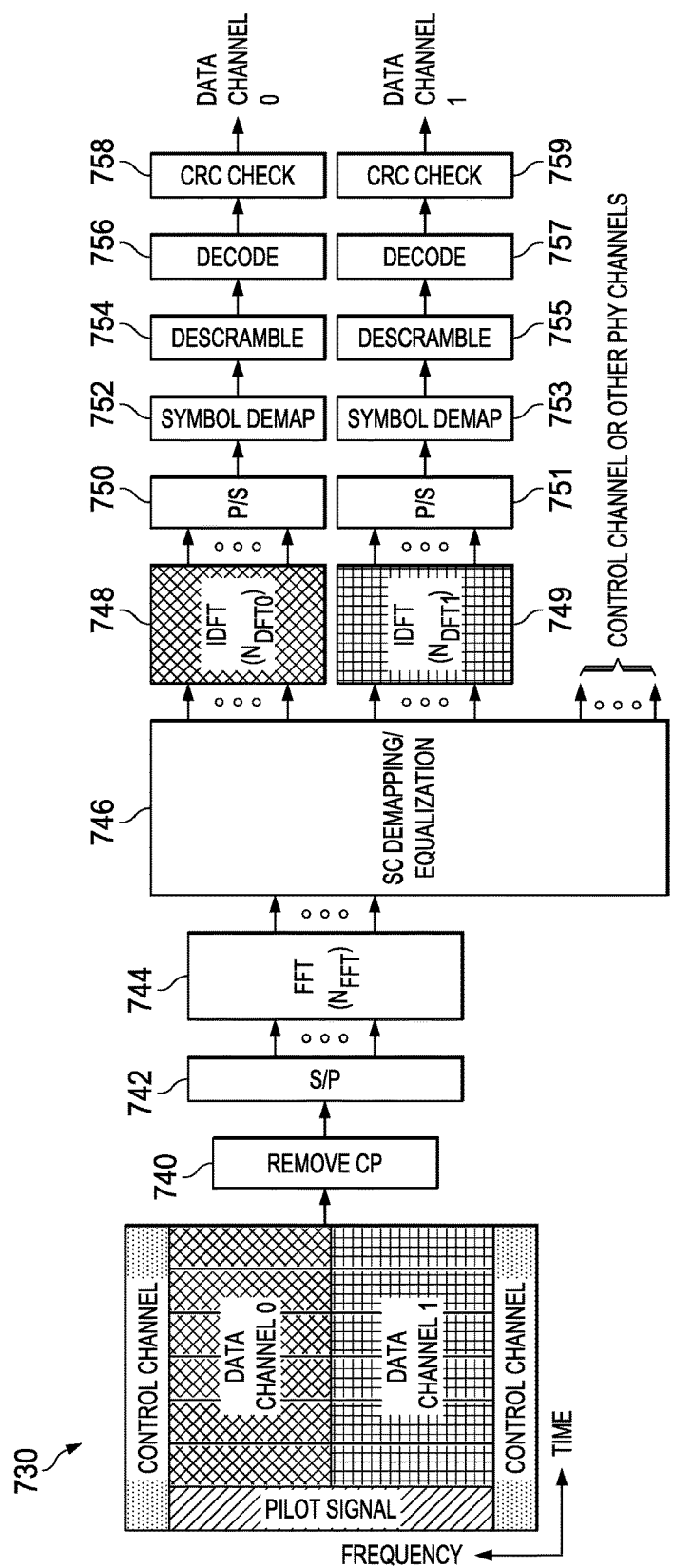
FIG. 7B is a diagram of a baseband receiver of the present invention having two separate and parallel IDFT decoding stages.

FIG. 7B is a diagram of a baseband receiver of the present invention corresponding to the baseband transmitter of FIG. 7A and having two separate and parallel IDFT stages. Data 730 is applied to the baseband receiver, and the cyclic prefix (CP) is removed 740. Serial-to-parallel circuit 742 converts the data to a parallel data stream which is applied to fast Fourier transform (FFT) circuit 744. The resulting frequency-domain data is applied to subcarrier demapping and equalization circuit 746. Here, individual subcarriers are preferably equalized to compensate for channel effects. The equalized data is then applied to inverse discrete Fourier transform (IDFT) circuits 748 and 749. IDFT circuit 748 performs an $N_{DFT0}$ conversion corresponding to DFT circuit 710 on data channel 0. IDFT circuit 749 performs an $N_{DFT1}$ conversion corresponding to DFT circuit 711 on data channel 1. The resulting time-domain data is applied to parallel-to-serial circuits 750 and 751. The resulting serial data streams are each demapped by respective circuits 752 and 753. Here, a log likelihood ratio (LLR) calculation is performed on the received and equalized QAM symbols to provide soft-decision information for each information bit to a FEC decoder (e.g. Turbo decoder). The resulting soft-decision information is then descrambled by respective circuits 754 and 755. The descrambled data streams are applied to respective decode circuits 756 and 757. A cyclic redundancy check (CRC) is performed on each data stream by respective circuits 758 and 759 to verify correct data reception.

The previous examples of FIGS. 7A and 7B advantageously utilize all subcarriers of the 5 MHz through 20 MHz bandwidths without the expense of additional hardware. Data and control channel allocation sizes are specified as part of the air interface standard, so no additional software is required. The embodiments of FIGS. 7A and 7B are also adapted to separate data channels and their respective transport blocks.

Figure 8A:
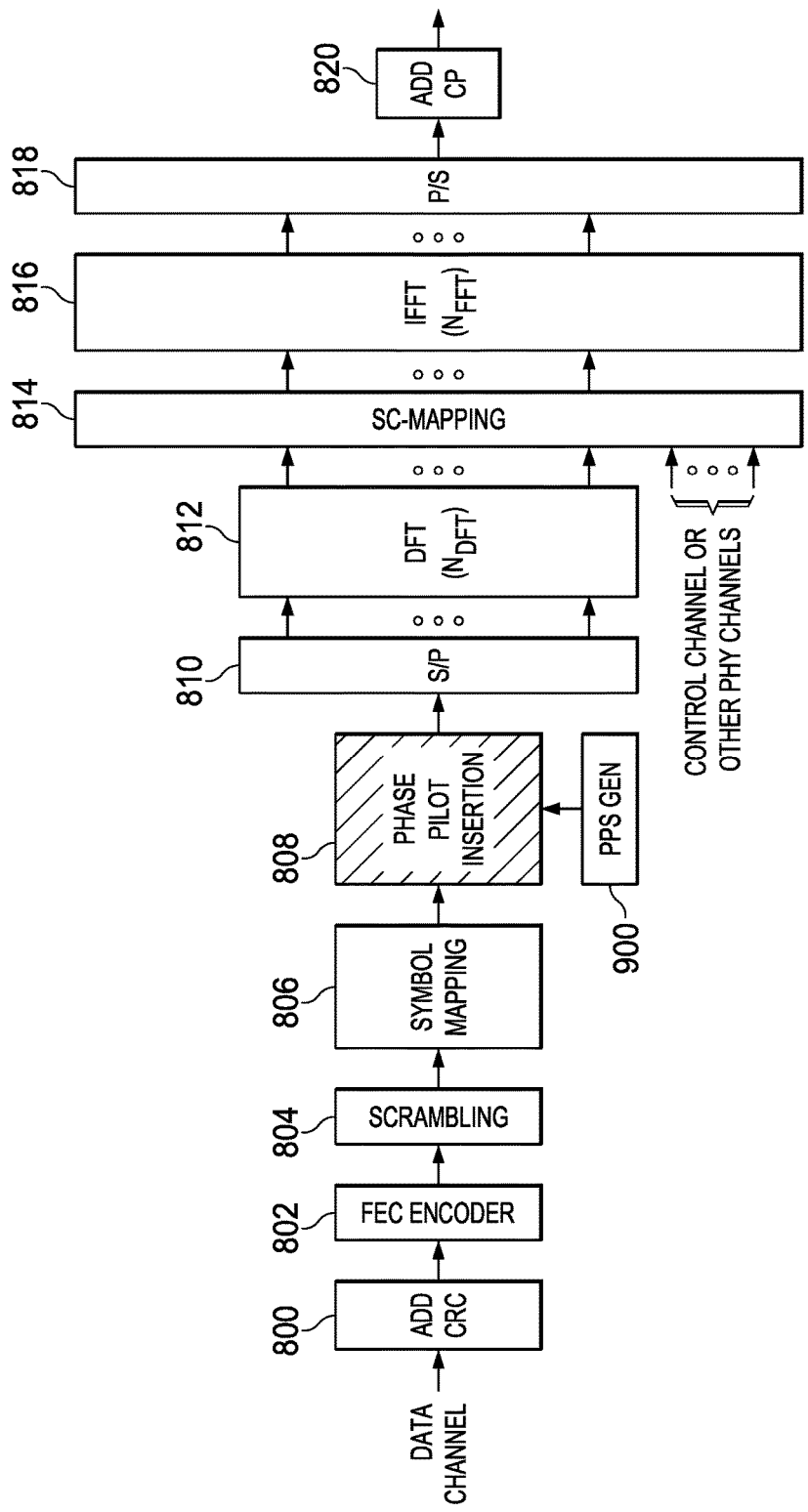
FIG. 8A is a diagram of a baseband transmitter of the present invention having time-domain phase pilot symbol insertion.

Referring now to FIG. 8A, there is a diagram of a baseband transmitter of the present invention having time-domain phase pilot symbol insertion. The baseband transmitter of FIG. 8A receives data signals and adds a cyclic redundancy check (CRC) block 800. The data is then encoded or precoded by a forward error correction (FEC) encoder 802 and scrambled by scrambling circuit 804. The scrambled data is mapped to appropriate symbol constellations 806. Phase pilot symbol (PPS) generator 900 generates a sequence of phase pilot symbols that are inserted into the time-domain data stream by phase pilot symbol insertion circuit 808. The phase pilot symbols allow a receiver to estimate, track, and compensate the phase noise in received QAM symbols. This allows significant phase noise mitigation according to the present invention and is very important for high-order modulation schemes including 256-QAM or higher QAM. It is especially advantageous in higher frequency bands such as 5 GHz unlicensed bands, microwave bands, and millimeter wave bands. The resulting data stream with phase pilot symbols is converted to a parallel data stream 810. Discrete Fourier transform (DFT) circuit 812 converts the data to frequency-domain and applies it to a subcarrier (SC) mapping circuit 814 together with control channel and other physical (PHY) channel data. The parallel data stream is then converted back to time-domain data 816 and converted to a serial data stream 818. A cyclic prefix is appended to the serial data stream 820.

Figure 8B:
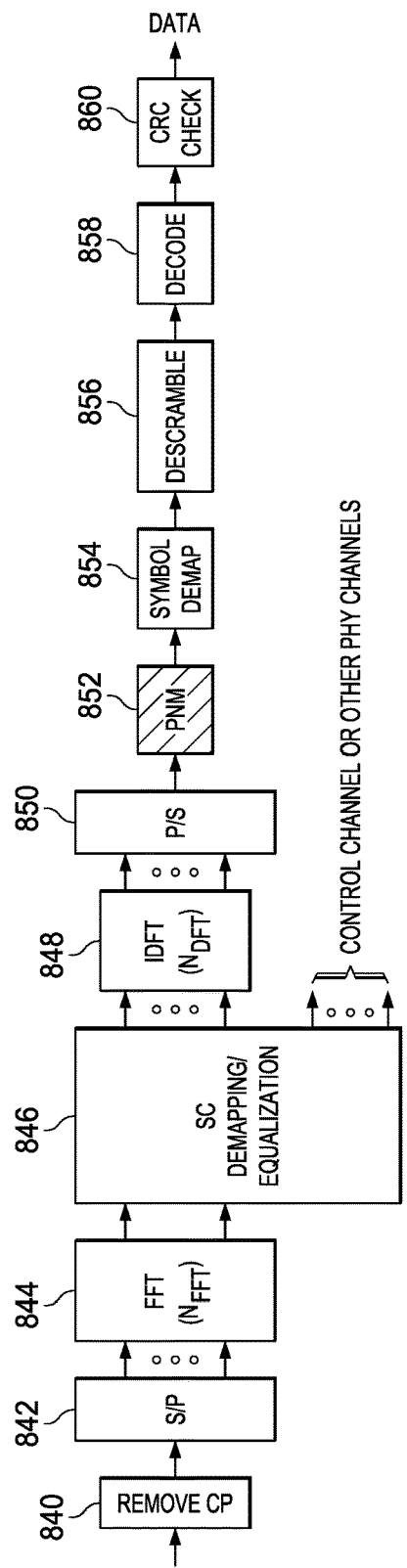
FIG. 8B is a diagram of a baseband receiver of the present invention having phase noise mitigation (PNM)

FIG. 8B is a diagram of a baseband receiver of the present invention that may be used with the baseband transmitter of FIG. 8A. Data is applied to the baseband receiver, and the cyclic prefix (CP) is removed 840. Serial-to-parallel circuit 842 converts the data to a parallel data stream which is applied to fast Fourier transform (FFT) circuit 844. The resulting frequency-domain data is applied to subcarrier demapping and equalization circuit 846. Here, individual subcarriers are preferably equalized to compensate for channel effects. The equalized data is then applied to inverse discrete Fourier transform (IDFT) circuit 848. IDFT circuit 848 performs an $N_{IDFT}$ conversion corresponding to DFT circuit 810. The resulting time-domain data is applied to parallel-to-serial circuit 850. The resulting serial data stream is then applied to phase noise mitigation (PNM) circuit 552. The PNM circuit estimates and tracks phase noise embedded in the received and equalized quadrature amplitude modulated (QAM) symbols. The PNM circuit compensates for the embedded phase noise using the known phase pilot symbols 900 from the baseband transmitter. The compensated QAM data stream is then applied to symbol demapping circuit 854. The resulting information bits are then descrambled 856 and applied to decode circuit 858. The resulting decoded data is then applied to cyclic redundancy check (CRC) circuit 860 to verify correct data reception.

Figure 8C:
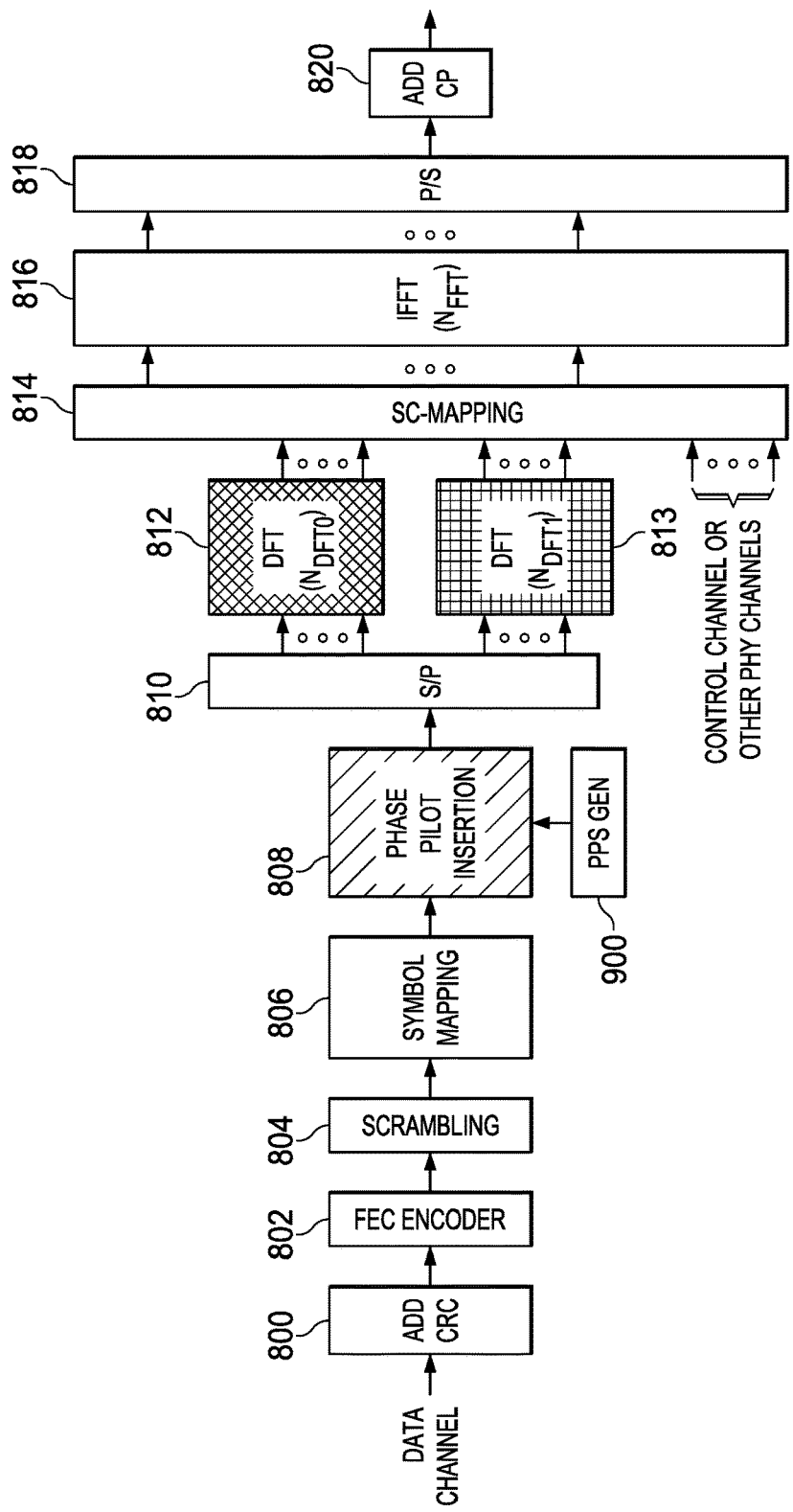
FIG. 8C is a diagram of a baseband transmitter of the present invention having time-domain phase pilot symbol insertion with two separate DFT precoding stages.

Referring next to FIG. 8C, there is a diagram of a baseband transmitter of the present invention having time-domain phase pilot symbol insertion having two separate DFT precoding stages. The precoding portion (800-806) of the baseband transmitter of FIG. 8C operates as previously discussed with reference to FIG. 8A. Phase pilot symbol (PPS) generator 900 generates a sequence of phase pilot symbols that are inserted into the time-domain data stream by phase pilot symbol insertion circuit 808. The resulting data stream with phase pilot symbols is converted to a parallel data stream 810. Discrete Fourier transform (DFT) circuits 812 and 813 convert data to frequency domain and apply it to a subcarrier (SC) mapping circuit 814 together with control channel and other physical (PHY) channel data. DFT circuit 812 performs an $N_{DFT0}$ conversion. DFT circuit 813 performs an $N_{DFT1}$ conversion. Taken together, they allocate all available subcarriers to the data channel, and all available subcarriers are used. The parallel data stream is then converted back to time-domain data 816 and converted to a serial data stream 818. A cyclic prefix is appended to the serial data stream 820.

Figure 8D:
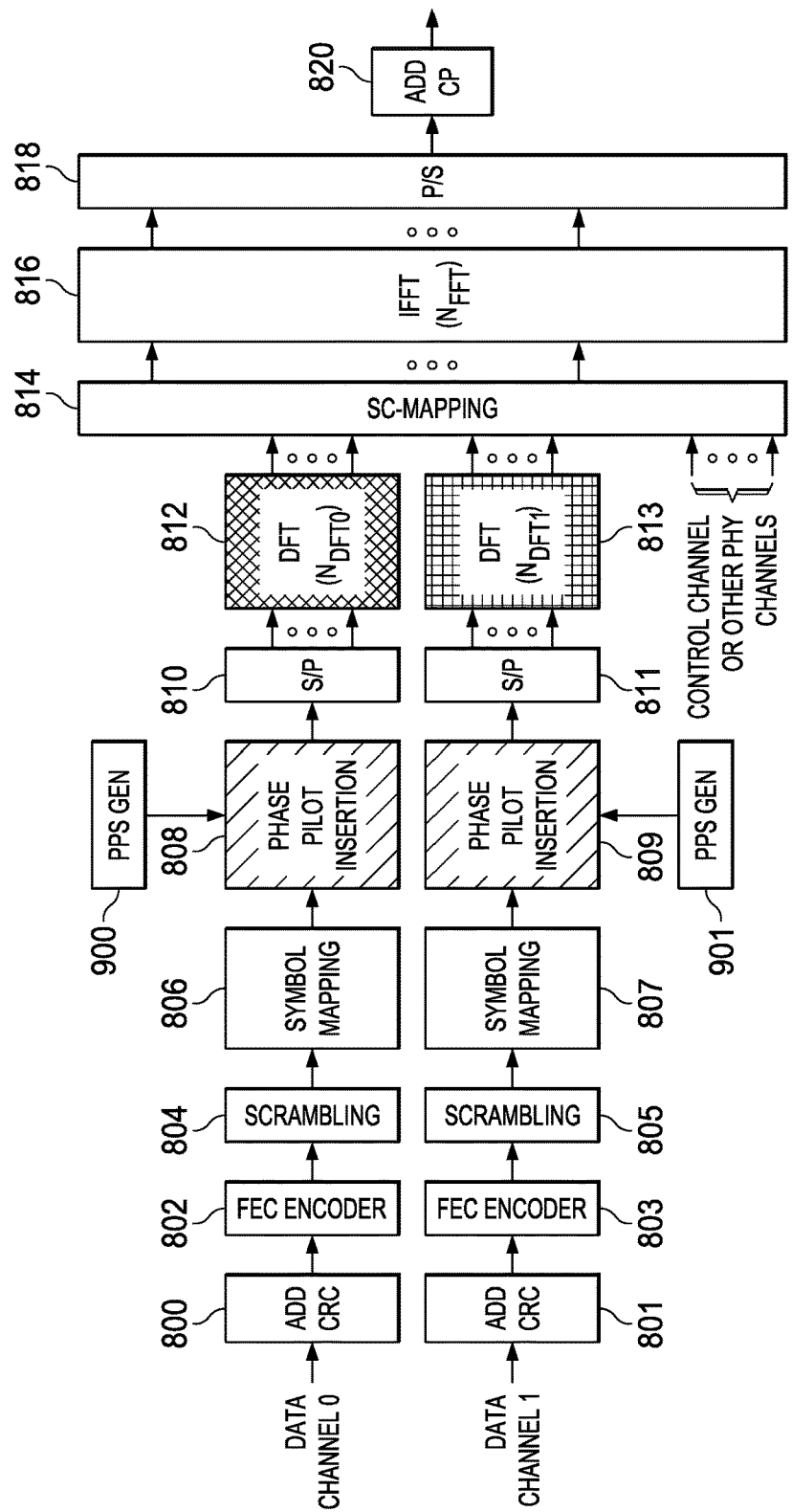
FIG. 8D is a diagram of a baseband transmitter of the present invention having time-domain phase pilot symbol insertion and two separate and parallel DFT precoding stages.

FIG. 8D is a diagram of another embodiment of a baseband transmitter of the present invention having time-domain phase pilot symbol insertion and two separate and parallel DFT preceding stages. As previously discussed with reference to FIG. 7A, this embodiment provides two separate data channels, each having its own respective transport block. Data channel 0 includes CRC circuit 800 and FEC encoder circuit 802 followed by scrambling circuit 804. Scrambled data is symbol mapped by circuit 806 and applied to phase pilot insertion circuit 808. Circuit 808 inserts phase pilot symbols from PPS generator circuit 900 into the serial data stream. Serial-to-parallel (S/P) circuit 810 converts this to a parallel data stream and applies it to DFT circuit 812, having size $N_{DFT0}$. Data channel 1 is formed in parallel with data channel 0 and includes CRC circuit 801 and FEC encoder circuit 803 followed by scrambling circuit 805. Scrambled data is symbol mapped by circuit 807 and applied to phase pilot insertion circuit 809. Circuit 809 inserts phase pilot symbols from PPS generator circuit 901 into the serial data stream. Serial-to-parallel (S/P) circuit 811 converts this to a parallel data stream and applies it to DFT circuit 813, having size $N_{DFT1}$. The resulting frequency-domain data from data channels 1 and 2 is applied to a subcarrier (SC) mapping circuit 814 together with control channel and other physical (PHY) channel data. The parallel data stream is then converted back to time-domain data 816 and converted to a serial data stream 818. A cyclic prefix is appended to the serial data stream 818.

Figure 9A:
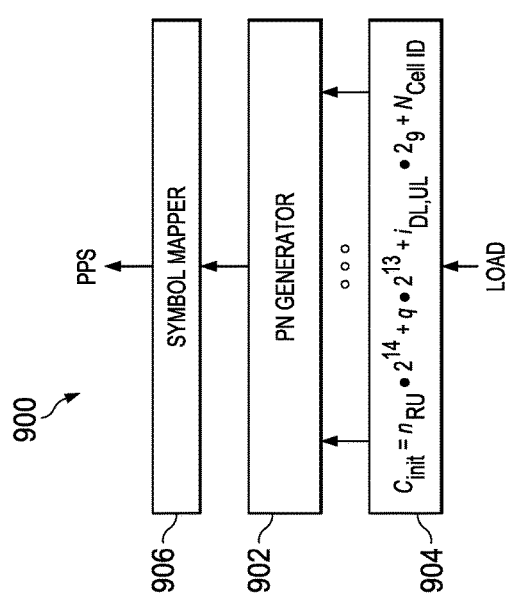
FIG. 9A is a diagram of a phase pilot symbol generator circuit that may be used in FIG. 8A, 8C, or 8D.

Referring now to FIG. 9A, there is a diagram of a phase pilot symbol (PPS) generator circuit 900 or 901 that may be used in FIG. 8A, 8C, or 8D. The PPS generator includes a pseudorandom noise (PN) generator circuit 902 that may be formed from one or more linear feedback shift registers (LFSRs) with appropriate feedback circuitry as is known to those of ordinary skill in the art. The PN generator circuit 902 preferably generates a pseudorandom noise (PN) sequence such as a Gold code that is used for the PPS symbols. The PPS generator includes a symbol mapper circuit 906 that is coupled to receive the PN sequence. The symbol mapper circuit 906 preferably maps two PN sequence bits into a quadrature phase shift keyed (QPSK) symbol to form a PPS. Of course, the symbol mapper may be adapted to map PN sequence bits to other symbols, such as QAM symbols. The QPSK PPS is preferably produced at a higher power than the QAM data symbols to facilitate receiver phase noise mitigation under low SNR or bad channel conditions. The PPS generator also includes a seed circuit 904 that is coupled to receive a load signal. An active level of the load signal loads the initialization sequence $c_{init}$ into generator circuit 902 at the start of each radio frame. In a preferred embodiment of the present invention, $c_{init}$ may be as defined by equation [1].

$$c_{init}=n_{RU}\cdot 2^{14}+q\cdot 2^{13}+i_{DL,UL}\cdot 2^9+N_{ID}^{cell} \quad [1]$$

Here, $n_{RU}$ is the index of a remote unit (RU) or other receiving unit as in FIG. 1, q is a binary codeword index, $i_{DL,UL}$ is a binary index indicating a downlink (DL) or uplink (UL) sequence, and N is the cell ID of the wireless cell. The notation $2^K$ is used to indicate stage K of an LFSR which receives the initialization seed.

Figure 9B:
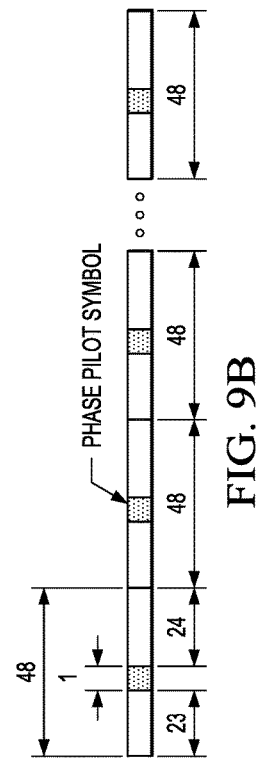
FIG. 9B is a diagram showing phase pilot symbols inserted within 48 QAM symbols.

FIG. 9B, there is a diagram showing phase pilot symbols inserted within 48 QAM symbols. The PPS is inserted into a Phase Pilot (PHP) block having a predetermined even length $N_{PHP}$ such as 48. $N_{DFT}/N_{PHP}$ phase pilot symbols are inserted into the PHP block. Preferably, each PPS is inserted such that there are $N_{PHP}/2-1$ modulation symbols before and $N_{PHP}/2$ modulation symbols after the PPS. For example, the left PHP block of FIG. 9B includes 23 leading modulation symbols, one PPS, and 24 trailing modulation symbols for a total of 48 symbols. Similarly, if a last PHP block has length $N_{PHP,last}$, the PPS is inserted such that there are $N_{PHP,last}/2-1$ modulation symbols before and $N_{PHP,last}/2$ modulation symbols after the PPS. In the example of FIG. 9B, the PPS advantageously compensates for phase noise embedded in the QAM symbol stream with only a 2% overhead. Insertion of the PPS is preferably enabled or disabled through higher layer signaling for each RU or receiving unit independently.

Still further, while numerous examples have thus been provided, one skilled in the art should recognize that various modifications, substitutions, or alterations may be made to the described embodiments while still falling with the inventive scope as defined by the following claims. Furthermore, embodiments of the present invention may be implemented in software, hardware, or a combination of both. Other combinations will be readily apparent to one of ordinary skill in the art having access to the instant specification.

What is claimed is:

1. A method of operating a communication system, comprising:
   receiving a first data stream;
   mapping the first data stream into a first series of quadrature amplitude modulated (QAM) symbols;
   producing, by a first pseudorandom noise generator in an apparatus, a first pseudorandom noise (PN) sequence;
   mapping, by a first symbol mapper circuit in the apparatus, a plurality of bits of the first PN sequence to a first phase pilot symbol;
   inserting, by a first phase pilot symbol insertion circuit in the apparatus, the first phase pilot symbol into the first series of QAM symbols;
   converting, by a first discrete Fourier transform (DFT) circuit in the apparatus, the first data stream to a first frequency-domain data stream by a DFT having $N_{DFT0}$ size after the step of inserting, wherein $N_{DFT0}$ is a positive integer;
   mapping, by a subcarrier mapping circuit in the apparatus, the first frequency-domain data stream to respective first subcarriers;
   converting, by a first inverse discrete Fourier transform (IDFT) circuit in the apparatus, the respective first subcarriers to a first time-domain data stream by an IDFT having size $N_{FFT}$, where $N_{FFT}$ is a positive integer;
   receiving a second data stream in parallel with the first data stream;
   mapping the second data stream into a second series of QAM symbols, wherein mapping the second data stream into the second series of QAM symbols is in parallel with mapping the first data stream into the first series of QAM symbols;
   producing, by a second pseudorandom noise generator in the apparatus, a second pseudorandom noise PN sequence;
   mapping, by a second symbol mapper circuit in the apparatus, a plurality of bits of the second PN sequence to a second phase pilot symbol;
   inserting, by a second phase pilot symbol insertion circuit in the apparatus, the second phase pilot symbol into the second series of QAM symbols;
   converting, by a second DFT circuit in the apparatus, the second data stream to a second frequency-domain data stream by a discrete Fourier transform (DFT) having $N_{DFT1}$ size, wherein $N_{DFT1}$ is a positive integer; and
   mapping, by the subcarrier mapping circuit in the apparatus, the second frequency-domain data streams to respective second subcarriers.

2. The method of claim 1, comprising producing the first PN sequence in response to at least one of a remote unit (RU) index, a codeword index, a cell identification, and a downlink (DL) or uplink (UL) index.

3. The method of claim 1, comprising adding a cyclic prefix to the first time-domain data stream.

4. The method of claim 1, comprising:
   receiving an input data stream;
   encoding the input data stream with a forward error correction code (FEC) to produce an FEC encoded data stream;
   mapping the FEC encoded data stream into a plurality of data symbols; and
   producing the first and second data streams from the plurality of data symbols.

5. The method of claim 4, comprising scrambling the FEC encoded data stream prior to the step of mapping the FEC encoded data stream into the plurality of data symbols.

6. The method of claim 1, comprising selecting $N_{DFT0}$ and $N_{DFT1}$ to minimize a number of unused subcarriers.

\* \* \* \* \*